DIGITAL STORAGE AND GENERATION OF VIDEO SIGNALS

Filed April 7, 1965 7 Sheets-Sheet 1

INVENTOR.
ROBERT J. CLARK
BY Floyd M. Harris
Attorney

June 11, 1968 R. J. CLARK 3,388,391

DIGITAL STORAGE AND GENERATION OF VIDEO SIGNALS

Filed April 7, 1965 7 Sheets-Sheet 2

INVENTOR.
ROBERT J. CLARK
BY Floyd M. Harris
Attorney

DIGITAL STORAGE AND GENERATION OF VIDEO SIGNALS

Filed April 7, 1965 7 Sheets-Sheet 3

INVENTOR.
ROBERT J. CLARK
BY
Floyd M. Harris
Attorney

DIGITAL STORAGE AND GENERATION OF VIDEO SIGNALS

Filed April 7, 1965 7 Sheets-Sheet 4

INVENTOR.
ROBERT J. CLARK
BY
Floyd M. Harris
Attorney

DIGITAL STORAGE AND GENERATION OF VIDEO SIGNALS

INVENTOR.
ROBERT J. CLARK
BY Floyd M. Harris
Attorney

INVENTOR
ROBERT J. CLARK
BY
Floyd M. Harris
Attorney

INVENTOR.
ROBERT J. CLARK
BY
Floyd M. Harris
Attorney 3,388,391

DIGITAL STORAGE AND GENERATION OF VIDEO SIGNALS

Robert J. Clark, Dorion, Quebec, Canada, assignor to Radio Corporation of America, a corporation of Delaware Filed Apr. 7, 1965, Ser. No. 446,321
9 Claims. (Cl. 340—324)

ABSTRACT OF THE DISCLOSURE

A display system is provided that displays on a display device character patterns that are stored in a digitally coded form in a memory. The display device may comprise a picture tube exhibiting a standard television scanline raster pattern. Each character pattern is composed of a plurality of scanlines and one scanline displays slices of a plurality of character patterns. The display system generates scanline pulses corresponding in duration to the scanlines in the raster as well as dot pulses corresponding to small divisions of each scanline. Various combinations of such scanline pulses and dot pulses are utilized to form all of the character patterns. To provide such a display, the digitally encoded character codes are first decoded to provide different character identifier pulses for each different character and having a duration of one character space on the display device. The character identifier pulses are then combined with scanline pulses to extract a set of scanlines for each character wherein identical dot sequences are grouped together. Such sets of signals are then combined with the dot pulses to apply these dot pulses to the display device in the proper scanlines.

The present invention is an improvement on the embodiment of a system of this type described in patent application Ser. No. 316,581, now Patent No. 3,354,381 filed Oct. 16, 1963, in the names of A. C. Stocker, D. A. Cole and C. R. Corson, entitled, "Digital Storage and Generation of Video Signals."

An object of the invention is to provide an improved digital data processing system for displaying data as a message page.

A further object of the invention is to provide an improved digital-to-video signal generator.

A further object of the invention is to provide an improved digital-to-video signal generator which permits a large duplication of standard logic blocks.

A further object of the invention is to provide an improved digital-to-video signal generator that supplies improved quality video signals.

A still further object of the invention is to provide an improved digital-to-video signal generator that can easily be expanded to present the particular displays desired for particular applications.

In the system described in the above-identified Stocker et al. application, a row of characters is written on the display screen by writing part of each character during one horizontal scan line across the row, by writing another part of each character during the next horizontal scan, etc., until at the end of seven scan lines, for example, the row of characters is written and displayed on the screen. Each character occupies a character space in the row, and each character is written on the screen by lighting certain dot positions within the character space and positioned on the scan lines. In Stocker et al., one particular lead is energized by a pulse in response to the read-out of a character code, this pulse being one character space long and being referred to as the character-identifier pulse in the present application. Scanline count or scan-line select pulses are generated for identifying the scan line on which dot positions are to be lighted. Also, position count or dot-select pulses are generated for identifying the dot positions to be lighted within a character space and on a particular scan line.

With respect to the above-described features of Stocker et al., the system of the present application is the same. An important difference, however, is that in Stocker et al. the video signal is taken from a plurality of AND gates to each of which is applied a character-identifier pulse, a scan line count (scan-line select) pulse, and a position count (dot-select) pulse. The video signals are taken off these AND gates. In the present invention, on the other hand, one group of gates is used to identify the scan line position, and a second group of gates is used to identify the dot positions. More specifically, in the present invention a first group of gates (scan-line select gates) has character-identifier pulses and scan-line select pulses applied to the gates so that the character-identifier pulse is gated through to appear on certain gate output leads to identify the scan line (and character space) on which dots are to be lighted. A second group of gates (dot-select gates) has dot-select pulses and the output pulses of the scan-line select gates applied to the gates of this second group so that their outputs are video pulses identifying the dots to be lighted on the scan lines selected by the first group of gates. This arrangement of the present invention lowers the cost and simplifies manufacture and assembly of the system because it permits a large duplication of standard logic blocks. It also provides greater flexibility in designing the system for producing the particular display desired for a particular application. It also supplies an improved quality video signal.

Another difference between Stocker et al. and the present invention is, that unlike Stocker et al., the system of the present invention includes a buffer between the memory and the character register, the use of which provides advantages that will appear from the following description.

The invention will be described in detail with reference to the accompanying drawings in which:

FIGS. 1 and 2, taken together, are a graphic illustration of the manner in which characters can be displayed on a cathode ray tube in the operation of the embodiment of the invention shown in the following figures:

FIG. 3 is a block diagram illustrating an embodiment of the invention;

Figure 11:
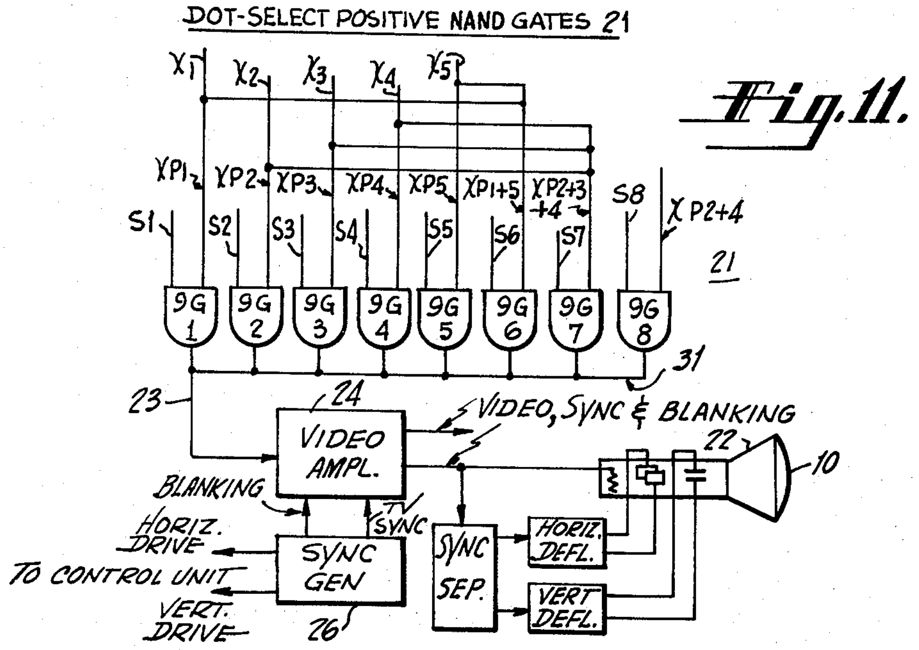
Figure 10:
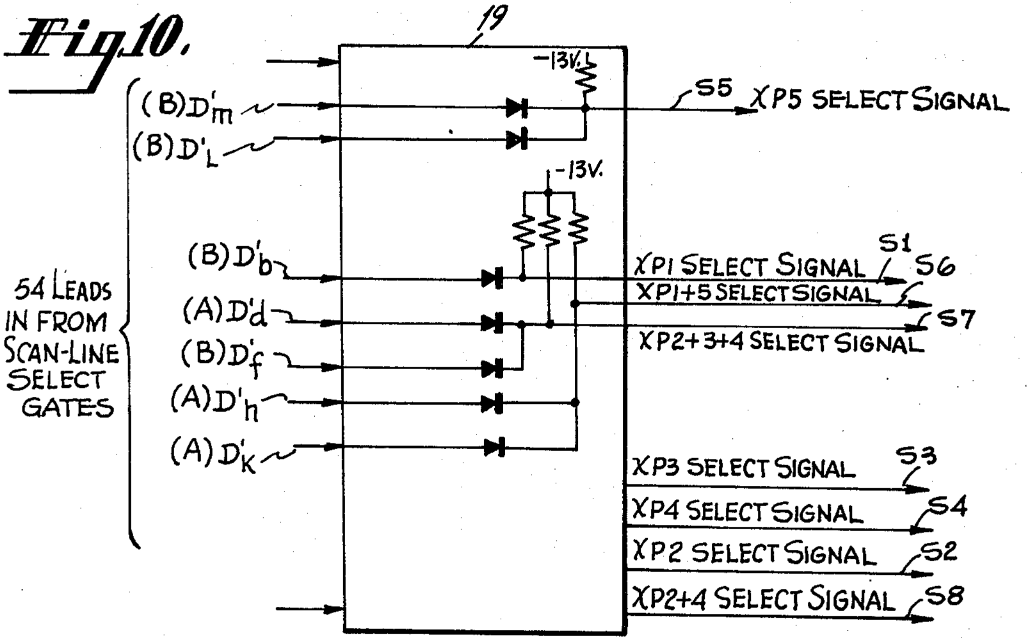

FIGS. *9a*, *9b*, *9c* and *9d* are block and circuit diagrams of the scan-line select gates shown in FIG. 3;

FIG. 10 is a block and partial circuit diagram of the diode matrix following the scan-line select gates as shown in FIG. 3; and FIG. 11 is a block and circuit diagram of the dot-select gates and of the synchronizing generator and the cathode ray tube shown in FIG. 3.

In the several figures like parts are indicated by similar reference characters.

Figure 1:
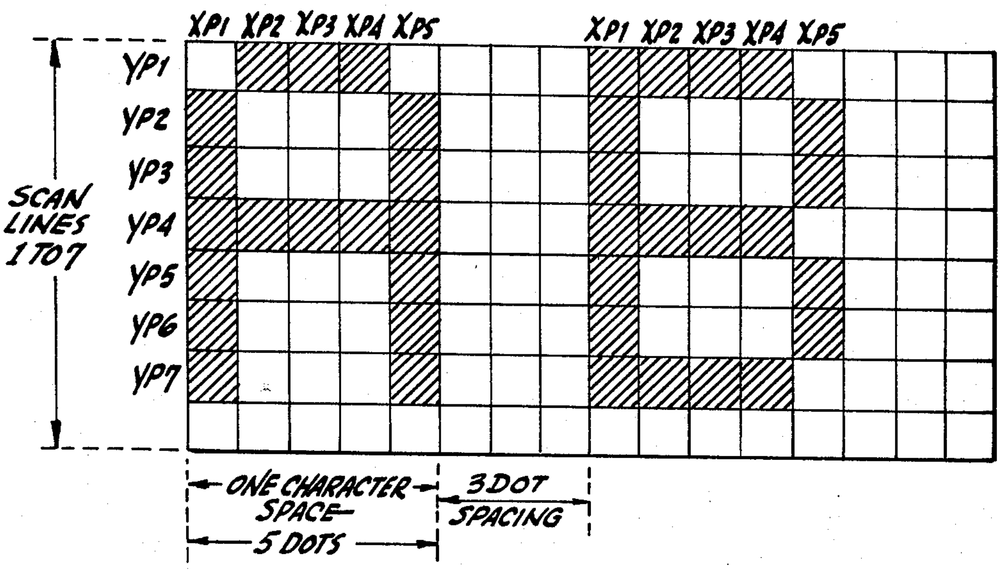
Figure 2:
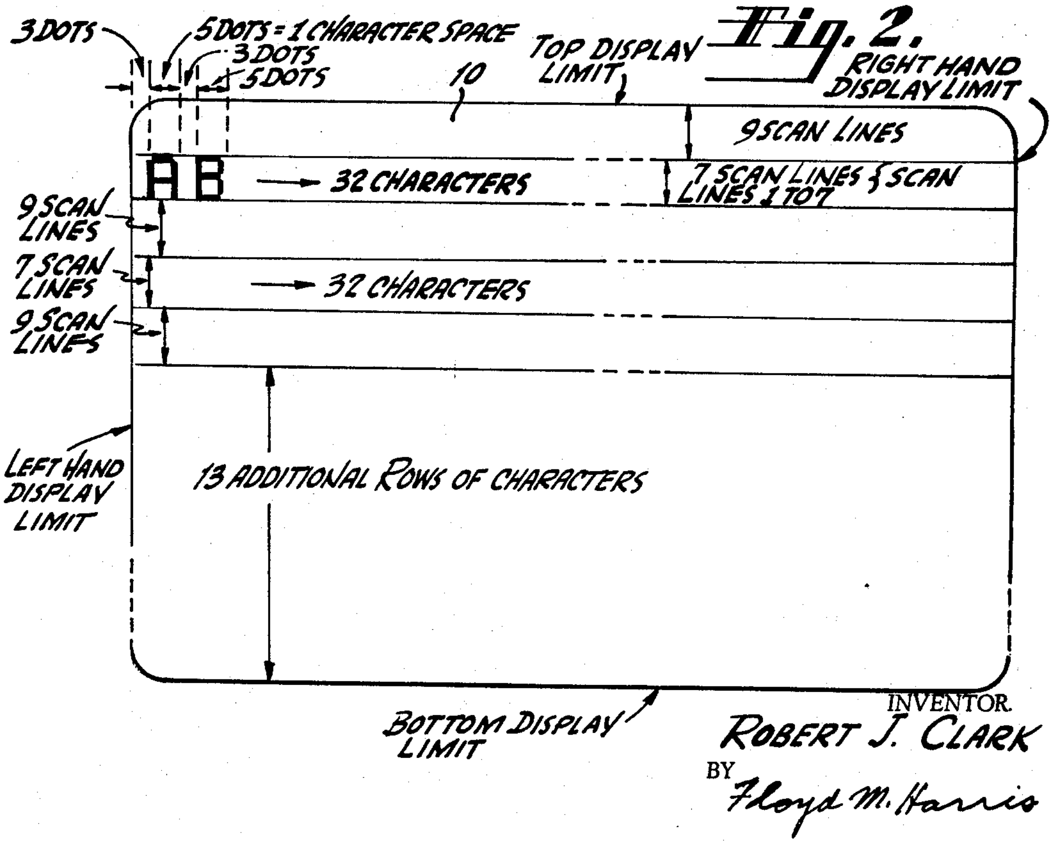
Figure 1:
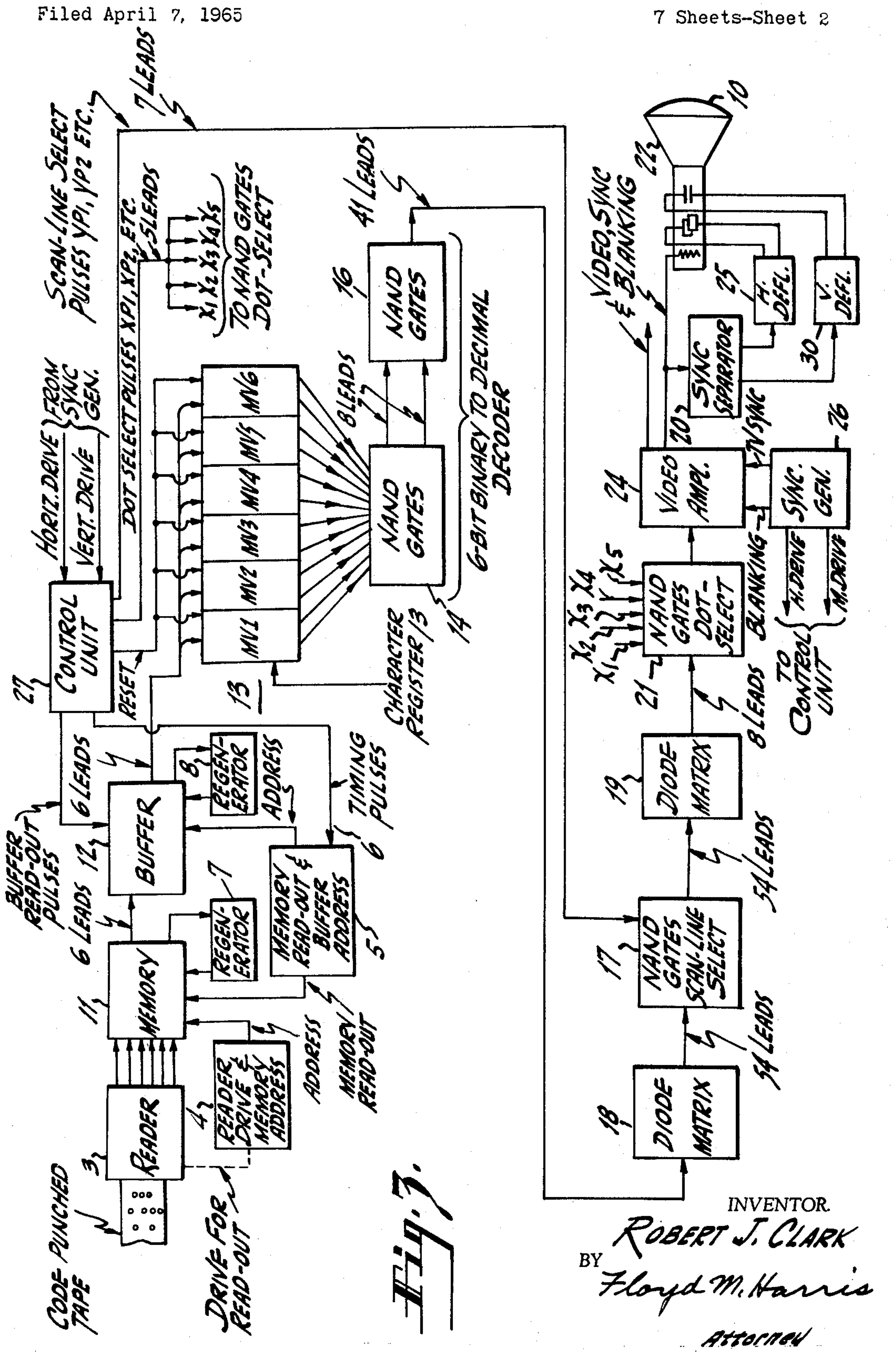

Before describing the invention with reference to the block and circuit diagrams of the drawing, reference is made to FIGS. 1 and 2 which show how the message is displayed on the cathode ray tube screen. FIG. 1 shows how a character is written on the screen. The space within which a character is written, referred to as the character space, is five dots wide and seven scan lines high as indicated by the rectangles in the space occupied by a character as shown in FIG. 1.

Y pulses, referred to as scan-line select pulses and identified as YP1 through YP7, occur at the scan line rate, one Y pulse occurring during each scan line and for the scan line duration. These Y pulses determine whether for a particular character one or more dot positions may be lighted during a particular scan line.

X pulses, which include dot spacer pulses and pulses referred to as dot-select pulses, the latter being identified as XP1 through XP5, occur at the rate of 256 per scan line in this example. For a particular character, these dot-select pulses cause the desired dot areas to be lighted during a particular scan line.

In FIG. 1 the lighted dot areas are shaded. It is apparent that the first character being displayed is the letter A. The next character being displayed is the letter B. It will be noted that there is a spacing of three dots between characters.

FIG. 2 illustrates how a message may be displayed. First, nine scan lines occur at the top of the cathode ray screen 10, during the occurrence of which digital data is read from a memory into a buffer. During the next seven scan lines the digital data is read out of the buffer, and one row of 32 characters are written on the screen and displayed. As described in the above-identified Stocker et al. application, during each scan line a portion of each character in a row is written. Thus, the writing of characters A and B shown in FIGS. 1 and 2 is completed during the seventh scan line.

The above-described sequence is repeated until fifteen rows of characters are written on the screen, assuming the message to be written is of a length that fully occupies the screen.

Figure 5:
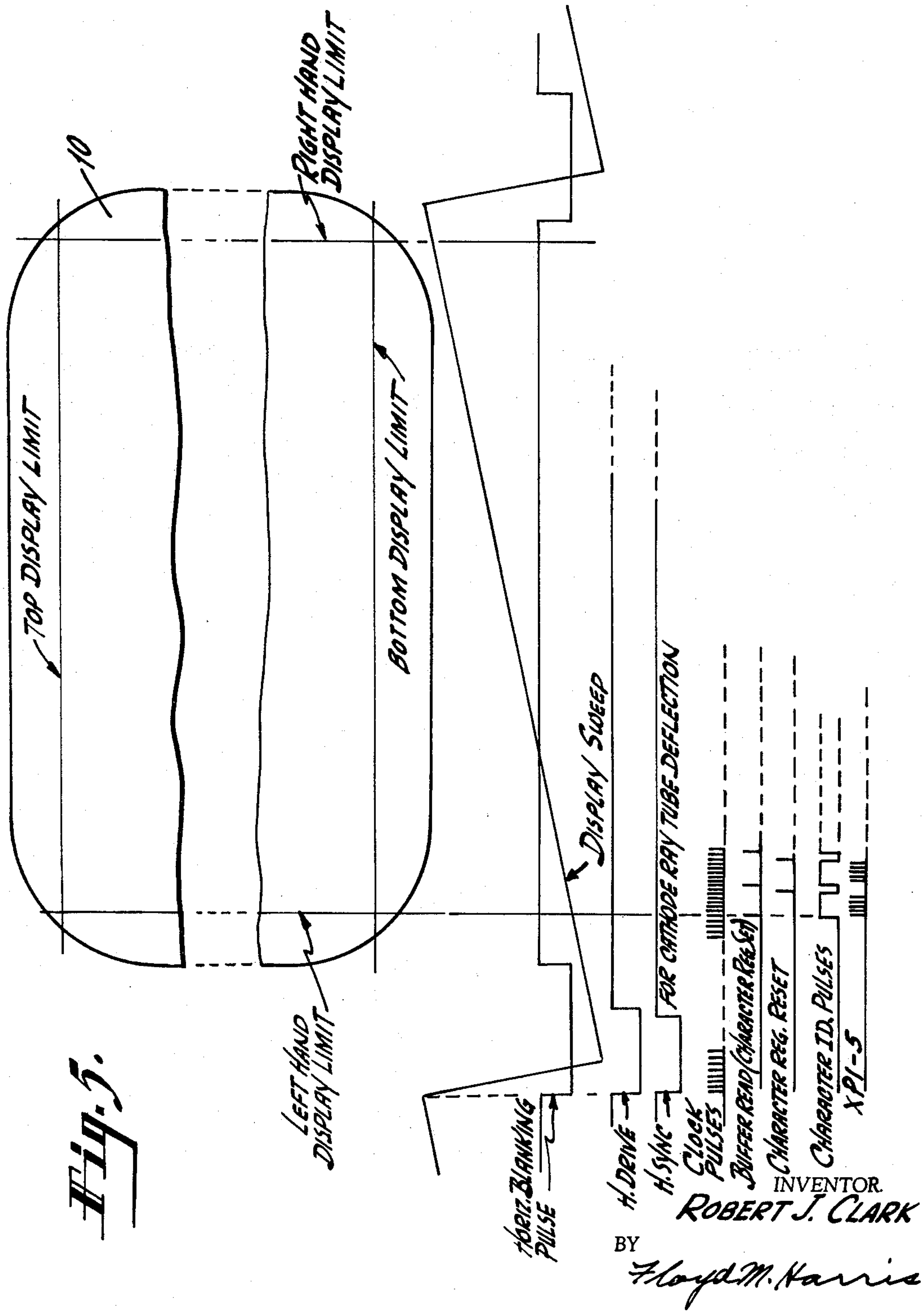
FIG. 5 is a group of timing diagrams that are referred to in explaining the invention.

Note that the message is located on the screen 10 between a left-hand display limit and a right-hand display limit, and between a top display limit and a bottom display limit as further illustrated in FIG. 5 in connection with the timing diagrams.

*Character register and binary to decimal decoder*

In the embodiment of the invention shown in FIG. 3, the digital-to-video signal generator is fed the digital data messages from a fast random access magnetic core memory 11 by way of a buffer 12. Each message character, such as the letter A, is transmitted to the memory as a 6-bit code. In the present example, the system is designed to display 41 different characters. A character register 13 comprising six multivibrators receives the character code read-out of the buffer and is "set" by the code. It is "reset" at the end of a character space. In accordance with the code set into the character register 13, a voltage is applied to a selected one of 41 leads (note the output leads of gates 16, identified as character-identifier leads), in this instance the lead representing the character A. The other leads of the 41 leads represent the remaining characters. The means for this lead selection includes a 6-bit binary to decimal decoder which comprises the NAND gates represented at 14 and 16 as described hereinafter. The voltage applied to the selected lead is one character space long in duration and is referred to as the character-identifier pulse. Since it occurs when the character code is read out of the buffer (this buffer read-out being in synchronism with the cathode ray scanning) it occurs at the position on a scanning line where the character is to be written.

*Process of reading character code into character register*

At this point the process of reading the character codes into the character register will be described with reference to FIG. 3. Assume, for example, that the character codes are on a code-punched tape. The code-punched tape is fed into a reader 3. The tape is advanced in steps (code by code) by a unit 4 driving the reader, and the reader feeds into the memory 11 directly or by way of a store. Address pulses (also from the unit 4) which are in synchronism with the memory write-in (feed in) store the codes on proper store units of the memory.

Since in the normally used process the data is read from the memory to a particular buffer a full row of characters at a time, memory time is available, while this same buffer is being read out, to service other buffers and/or input devices such as tape readers, keyboards, etc. (Note: the memory is written into during periods when it is not being read out to the buffers.)

Another way of operation, but not the one normally used, is to fill the memory with the message before it is displayed, and after the message is displayed, to erase the memory and store another message in the memory before there is another message display.

The message is non-destructively read out of the memory one character row at a time (is read out within the time of nine scan lines), regeneration being provided, for example, as indicated by the block 7, to make the read-out non-destructive. The memory read-out (and buffer write-in) starts in response to a vertical drive pulse. It is completed (one character row written into buffer) by the time the ninth scan line is completed and then the memory read-out stops. The memory read-out (buffer write-in) again starts in response to the termination of the last of the next seven scan lines (the character row having been displayed and the buffer having been erased). The next character row is now read out of the memory and written into the buffer during the next nine scan lines. This repeats until the message ends, a message of 15 rows being possible in this example.

The memory read-out is effected by read-out pulses which are synchronous with address pulses applied to the buffer, both the memory read-out pulses and the buffer address pulses being supplied from a memory read-out and buffer address unit 5. It will be noted that the memory read-out (and buffer write-in) is synchronous with the TV deflection in the sense that it has to be timed to occur during the nine scan lines preceding the seven character-writing scan lines, and also timed to start the message read-out at the start of the vertical deflection. This synchronization or timing is provided by timing pulses supplied from a control unit 27 over a lead 6 to the memory read-out and buffer address unit 5.

The buffer read-out occurs during the seven character-writing scan lines, and in synchronism with the TV deflection. Since there are to be 32 characters per scan line, there are 32 buffer read-out pulses per scan line. The 6-bit character codes that are read out are fed over six leads to the six MVs of the character register 13 which produces a character-identifier pulse (that is one character space long) on a selected one of the character-identifier leads corresponding to the character. Note that during the buffer read-out occurring during the seven scan lines, the information is non-destructively read from the buffer. Non-destructive read-out of the buffer may be accomplished, for example, by the use of regeneration as indicated by the block 8 labeled "regenerator."

During the first of the following nine scan lines the information is cleared from the buffer making it ready for receiving the next row of characters from the memory.

*Scan-line select and dot-select*

The proper scan-line positioning of the video dots for a character is determined by scan-line select NAND gates 17 (FIG. 3). To certain ones of these gates, Y pulses are applied, which pulses occur during each scan line and for the duration of a scan line. Also, to certain ones of these NAND gates 17 the character-identifier pulse is applied by way of a diode matrix 18. In the present example, the matrix 18 has fifty-four output leads, one or more of which may be energized by a character-identifier pulse appearing on one of its forty-one input leads.

The scan-line select NAND gates 17 have fifty-four output leads in the present example. The applied character-identifier pulse and the Y pulses gate through to certain of these output leads the character-identifier pulse. For the character A, in the present example, the character-identifier pulse appears on a certain three of the fifty-four output leads, i.e., three leads are energized.

The fifty-four output leads of gates 17 connect to fifty-four input leads of a diode matrix 19 which has, in this example, eight output leads. The energized input leads of matrix 19 feed the character-identifier pulse to one or more selected ones of the eight output leads. For the character A, three energized input leads energize two output leads. These eight output leads go to dot-select NAND gates 21. Also applied to the NAND gates 21 are dot-select pulses XP1 to XP5. The dot-select NAND gates 21 determine the dots to be produced on the display screen for a particular character on a particular scan line.

Thus, the character-identifier pulse appearing on specific leads determined by the character code, together with the scan-line select NAND gate operation and the dot-select NAND gate operation, cause this particular character to be written on the display screen.

In FIG. 3 the cathode ray tube having the display screen 10 is shown at 22. The video signal from the dot-select NAND gates 21 is supplied over a lead 23 to a video amplifier 24 which applies amplified video signal to a control grid, for example, of the cathode ray tube 22.

A television synchronizing signal generator (normally a standard type for providing interlace scanning) is represented at 26. It supplies horizontal synchronizing and drive pulses at the rate of 15,750 per second and supplies vertical synchronizing and drive pulses at the rate of 60 per second. It also supplies television blanking pulses.

The horizontal and vertical synchronizing pulses and the blanking pulses are supplied to the video amplifier 24 where they are mixed with the video signal. This mixed signal is applied to the grid (or cathode) of the cathode ray tube 22 in accordance with conventional television practice. The mixed signal is also supplied to a synchronizing signal separator 20 which supplies horizontal synchronizing pulses to a horizontal deflection circuit 25 and supplies vertical synchronizing pulses to a vertical deflection circuit 30.

Figures 4, 6:
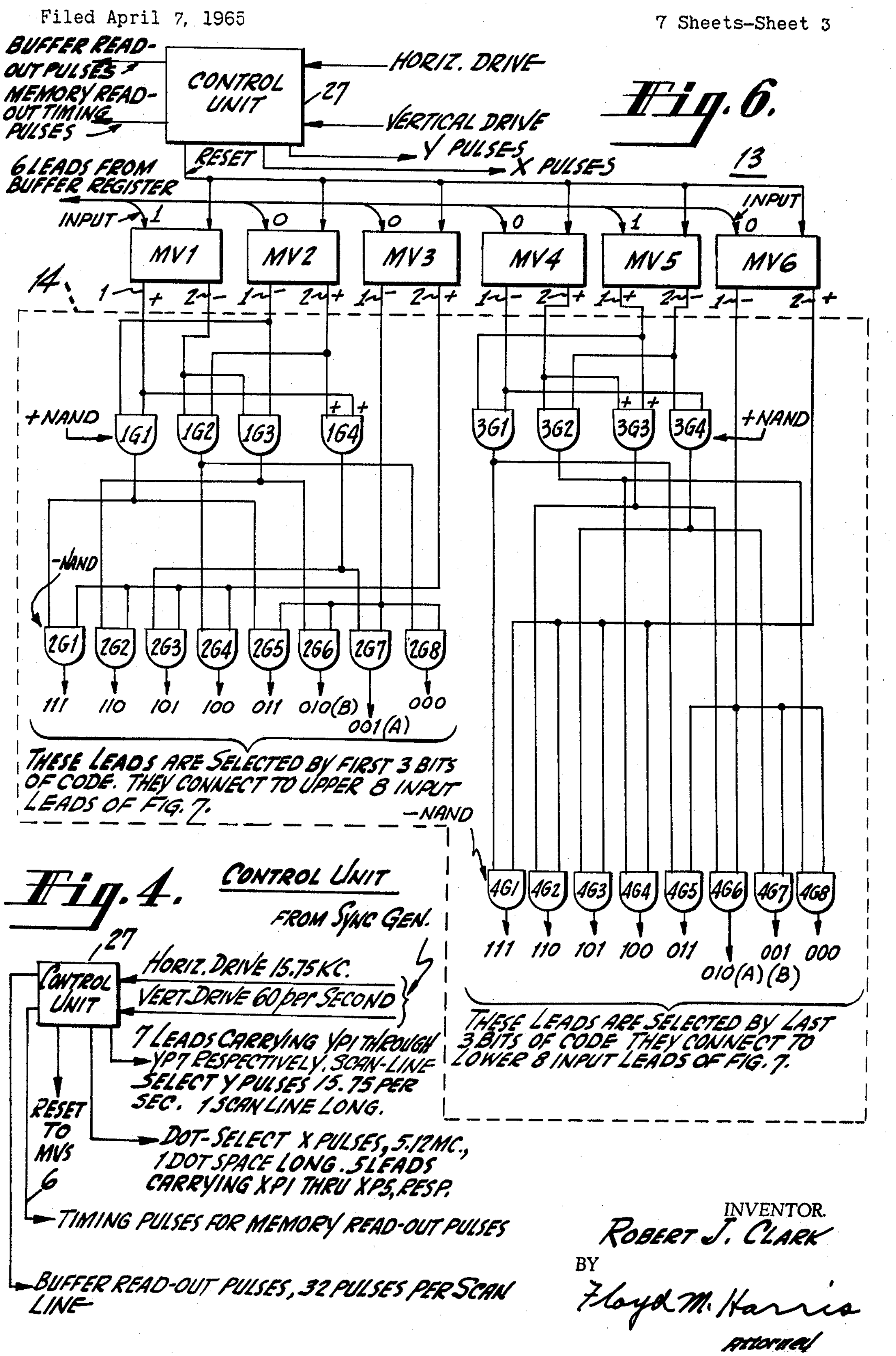
FIG. 4 is a block diagram of the control unit shown in FIG. 3, with legends indicating the output signals from the control unit.
FIG. 6 is a block and circuit diagram of the character register shown in FIG. 3, the control unit shown in FIGS. 3 and 4, and the NAND gates 14 comprising part of a 6-bit binary-to-decimal decoder, also shown in FIG. 3.

The horizontal and vertical drive pulses are supplied from the sync generator 26 to the control unit represented at 27 in FIGS. 3 and 4. The control unit 27 supplies Y pulses to the scan-line select gates 17, X pulses to the dot-select gates 21, and reset pulses to the multivibrators of the character register 13 as indicated in FIG. 3. The control unit 27 also supplies buffer read-out pulses to the buffer 12 and timing pulses over the lead 6 to the memory read-out and buffer address unit 5. In FIG. 4 in formation concerning certain of these pulses is given by the legends. The control unit 27 may be constructed in accordance with techniques well-known in the computer art. A satisfactory way of generating the Y and X pulses, the buffer read-out pulses and the character reset pulses in the control unit is described below by way of example.

*Y pulse generation*

The scan-line select Y pulses YP1, YP2, YP3, YP4, YP5, YP6 and YP7 may be produced on the seven leads, respectively, going to the NAND gates 17 as follows:

The horizontal drive pulses are applied to a counter in the control unit. This counter may be a chain of bistable multivibrators or flip-flops so that each stage is flipped upon the occurrence of the front edge of the drive pulse. Output leads from certain stages go to gates. There are seven leads from the gates. By use of proper gate connections the pulses YP1 through YP7 appear successively on each of the seven leads.

This counter stops at the end of the 256th scan line and is started again by the leading edge of the next vertical drive pulse. The horizontal drive pulses now proceed to drive the counter to produce the Y pulses, each having a duration one scan long.

Note that seven scan lines are used to form a character, and that these are preceded by nine scan lines (between rows of characters) during which there is buffer write-in. The top of the display starts with these nine scan lines.

Therefore, at the start of the counter drive the first sixteen horizontal drive pulses flip the counter stages, no output being taken during the first nine drive pulses. The output is taken during the last seven drive pulses (during the last seven scan lines) and applied to the gates which gate through the pulses YP1 through YP7 to the seven leads, respectively. The drive of the counter by the horizontal drive pulses then repeats and continues until it stops at the end of the 256th scan line.

*X pulse generation*

The X pulses including the dot-select pulses XP1, XP2, XP3, XP4 and XP5 occur at the rate of 5.12 mc. in the present example. This is determined by the fact that a scanning line duration is 54 microseconds, that there are 32 characters per scanning line, that there are five dots per character, and three dots between characters. Thus the rate of the X pulses is $$\frac{32\times 8}{50\mu s}=5.12 \text{ mc.}$$

The X pulses, consisting of XP1 through XP5 and the three dot selection pulses between characters, may be produced as follows:

A clock that produces pulses at the desired 5.12 mc. per second rate is synchronized to the leading edge of each horizontal drive pulse and thus synchronized to the beginning of a scan line. The clock pulses drive an X pulse generation counter consisting of successive stages of flip-flops so that each stage is flipped upon the occurrence of a clock pulse. Output leads from certain stages go to gates. There are five leads from the gates. By use of proper gate connections the pulses XP1 through XP5 appear successively on each of the five leads.

The X pulse generation counter registers up to 256 dot intervals (32 characters×8 dots) across the display screen. The counter begins counting from zero at the leading edge of the horizontal drive pulse and is reset to zero at the left-hand and right-hand limits (note FIG. 5) of the display screen. The reset pulses are generated by feedback techniques within the counter logic.

Note that there are three spacing dots beginning with the horizontal scan from the left-hand limit, then five dot-select pulses. This sequence is then repeated across the screen. Therefore, at the start of the counter drive the first eight clock pulses flip the counter stages, no output being taken during the first three clock pulses. The output is taken during the next five clock pulses and applied to the gates which gate through the pulses XP1 to XP5 to the five leads, respectively.

*Buffer read-out pulses*

The digital data, specifically the character codes, must be read out of the buffer 12 in synchronism with the cathode ray tube deflection. For the present example of 32 characters per scan line, there are 32 read-out pulses per scan line. Each read-out pulse starts the writing of a character in accordance with the character code read-out. Specifically, on read-out the six bits of the character code appear simultaneously on six leads, respectively, from the buffer 12. These six leads connect to the input or "set" leads of the six multivibrators MV1 to MV6 of the character register (FIG. 6). Thus, these six MVs are set in accordance with the character code read-out, and this results in the start of a character-identifier pulse as described in connection with FIG. 6. The read-out pulses are taken from the X pulse generation counter which is synchronized to the horizontal drive pulses.

Note the timing diagram of FIG. 5 showing the timing relation of the buffer read (read-out) pulses and the character-identifier (ID) pulses.

*Reset pulses for character register*

At the end of each character space the character-identifier pulse is terminated by resetting the six multivibrators of the character register. This resetting may be done with the dot-select pulse following the XP5 pulse, which may be preferred to as the XP6 pulse, or by any one of the pulses occurring between the XP5 pulse and the following XP1 pulse. The timing relation of such a reset pulse to other pulses is indicated in FIG. 5.

*Character register and binary-to-decimal decoder*

Refer to FIG. 6 which shows the control unit 27 as a block and which shows the character register comprising multivibrators (MVs) or flip-flops MV1 to MV6 and the group of NAND gates 14 which are individually identified as gates 1G1 to 1G4, 2G1 to 2G8, 3G1 to 3G4, and 4G1 to 4G8. The NAND gates 14 and the following NAND gates 16 (FIG. 7) form a 6-bit binary-to-decimal decoder. Each MV has an output lead 1 and an output lead 2. In the reset condition the output leads 1 are at a negative potential and the output leads 2 are at positive potential. In practice, the outputs on leads 1 and 2 preferably are amplified, in which case the leads 1 might be at ground on reset with the amplifiers in leads 1 having a negative voltage output.

The outputs of MV1, MV2 and MV3 are connected to a group of decoder gates 1G1 to 1G4 and 2G1 to 2G8 as shown. The gates 1G1 to 1G4 are positive NAND gates. The gates 2G1 to 2G8 are negative NAND gates.

The outputs of MV4, MV5 and MV6 are connected to a group of decoder gates 3G1 to 3G4 and 4G1 to 4G8. The gates 3G1 to 3G4 are positive NAND gates. The gates 4G1 to 4G8 are negative NAND gates.

THE CODES FOR 41 CHARACTERS

| Codes | | Characters | Codes | | Characters |
|---|---|---|---|---|---|
| 0 0 0 | 0 0 0 | 0 | 1 0 0 | 0 0 0 | — |
| 0 0 0 | 0 0 1 | 1 | 1 0 0 | 0 0 1 | J |
| 0 0 0 | 0 1 0 | 2 | 1 0 0 | 0 1 0 | K |
| 0 0 0 | 0 1 1 | 3 | 1 0 0 | 0 1 1 | L |
| 0 0 0 | 1 0 0 | 4 | 1 0 0 | 1 0 0 | M |
| 0 0 0 | 1 0 1 | 5 | 1 0 0 | 1 0 1 | N |
| 0 0 0 | 1 1 0 | 6 | 1 0 0 | 1 1 0 | O |
| 0 0 0 | 1 1 1 | 7 | 1 0 0 | 1 1 1 | P |
| 0 0 1 | 0 0 0 | 8 | 1 0 1 | 0 0 0 | Q |
| 0 0 1 | 0 0 1 | 9 | 1 0 1 | 0 0 1 | R |
| 0 1 0 | 0 0 0 | & | 1 1 0 | 0 0 0 | " |
| 0 1 0 | 0 0 1 | A | 1 1 0 | 0 1 0 | S |
| 0 1 0 | 0 1 0 | B | 1 1 0 | 0 1 1 | T |
| 0 1 0 | 0 1 1 | C | 1 1 0 | 1 0 0 | U |
| 0 1 0 | 1 0 0 | D | 1 1 0 | 1 0 1 | V |
| 0 1 0 | 1 0 1 | E | 1 1 0 | 1 1 0 | W |
| 0 1 0 | 1 1 0 | F | 1 1 0 | 1 1 1 | X |
| 0 1 0 | 1 1 1 | G | 1 1 1 | 0 0 0 | Y |
| 0 1 1 | 0 0 0 | H | 1 1 1 | 0 0 1 | Z |
| 0 1 1 | 0 0 1 | I | 1 1 1 | 0 1 1 | ' |
| | | | 1 1 1 | 1 0 0 | % |

Immediately preceding is a tabulation of the forty-one characters which may be displayed by the presently described example of the invention, together with the code for each character.

Assume that the six bit code representing the character A is read out of the buffer 12. In the present example the code for A is 010001. Of this code the first bit is the last one written, that is, it is 1. The sixth bit is the first one written; it is 0. The six bits are read out in parallel or simultaneously. The first bit is applied to the input or set lead of MV1, the second bit to the input lead of MV2, etc., the sixth bit being applied to the input lead of MV6. These bits as applied for the character A are indicated next to the input lead on which they appear. The resulting polarities on the leads 1 and 2 of the MV's now set by the code are indicated next to the leads.

It will be seen that the two input leads to positive NAND gate 1G4 are now positive so that its output lead is now negative. This negative lead applies negative signal to an input lead of the negative NAND gate 2G7. The other input lead of 2G7 receives negative signal from output lead 1 of MV3. Thus, positive signal appears on the output lead of 2G7. Therefore, this lead marked 001 has been selected or energized by the first three bits of the character A code. In a similar manner, the first three bits of other character codes will select or energize the output lead from the correct one of the gates 2G1 to 2G8. The gate output leads which are energized by certain codes are indicated by the codes marked near the leads. For example, it will be seen that the output lead of gate 2G1 will be energized by the code 111, this being the first three bits of a six bit code.

The last three bits of the A code, which are applied to the input or set leads of MV4, MV5 and MV6, in a similar fashion select or energize the output lead of gate 4G6, this lead being indicated by the code 010, the last three bits of the code for A. This output lead selection by the code 010 is made as follows. The positive NAND gate 3G3 has positive signal applied to one input lead from lead 1 of MV5. Positive signal is applied to the other input lead from lead 2 of MV4. Thus, the output lead of 3G3 is negative and applies negative signal to one input lead of the negative NAND gate 4G6. The other input lead of 4G6 receives negative signal from lead 1 of MV6. Thus, the output lead of 4G6 marked 010 is made positive; it has been selected or energized by the code 010 which are the last six bits of the code for A. In a similar manner the last three bits of the other character codes will select or energize the output lead from the correct one of the gates 4G1 to 4G8. The gate output leads which are energized by certain codes are indicated by the codes marked near the leads. For example, the output lead of 4G5 is made positive by the code 011.

From the foregoing it will be seen that a particular character code will energize one of the eight leads from gates 2G1 to 2G8 and will also energize one of the eight leads from gates 4G1 to 4G8.

Figure 7:
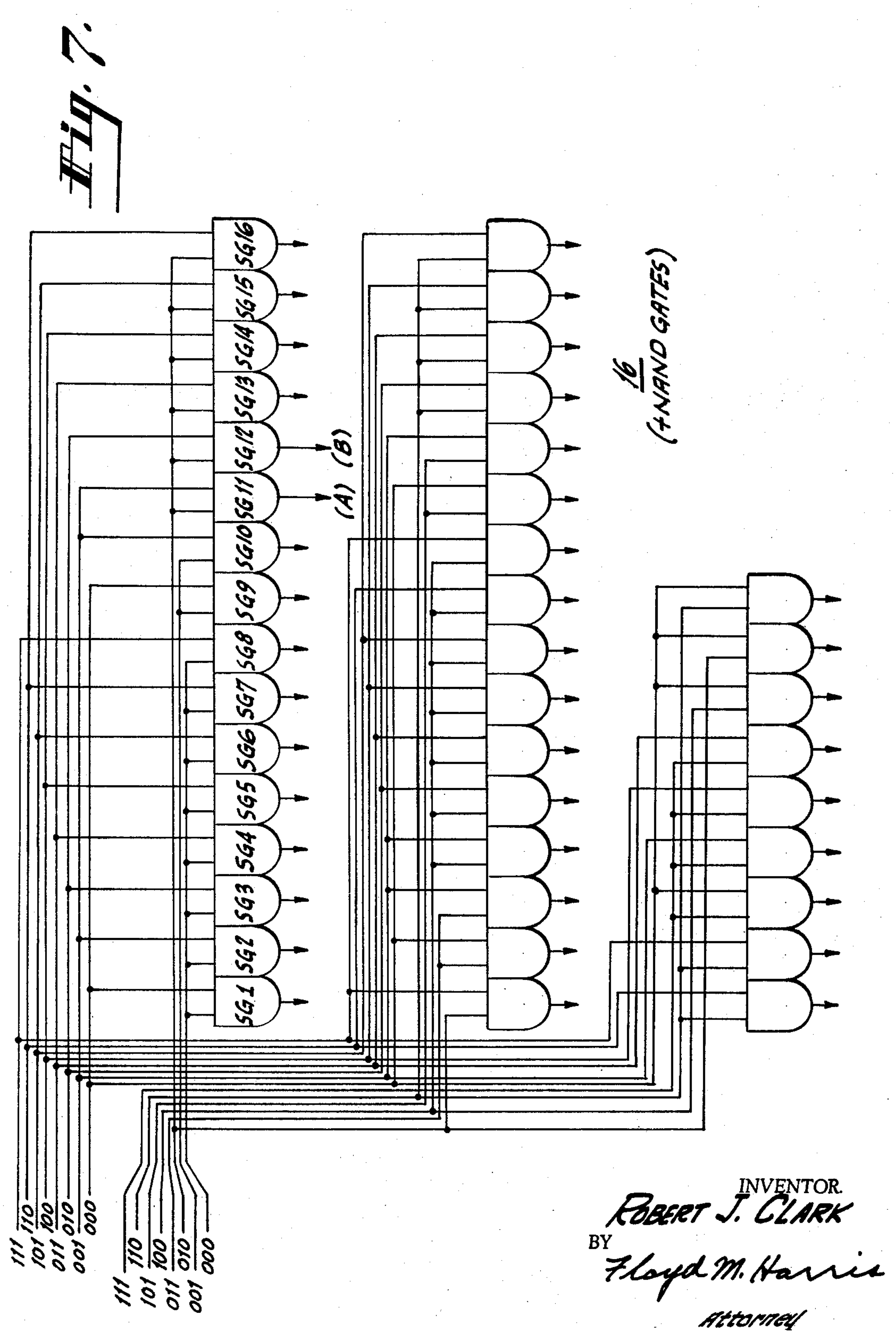
FIG. 7 is a block and circuit diagram of the NAND gates 16 which comprises the rest of the 6-bit binary-to-decimal decoder shown in FIG. 3.
Figure 9A:
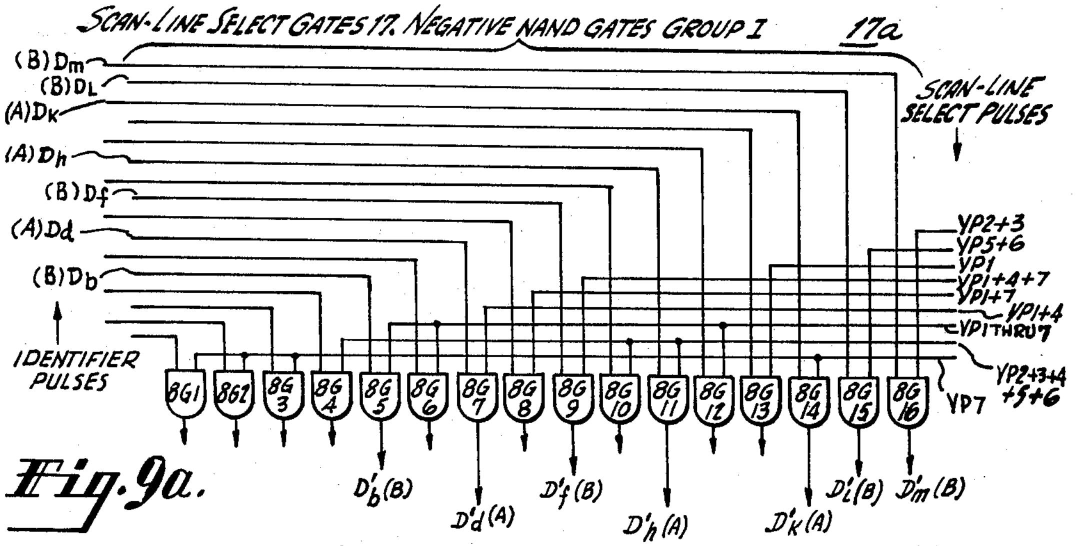
Figures 9B, 9C, 9D:
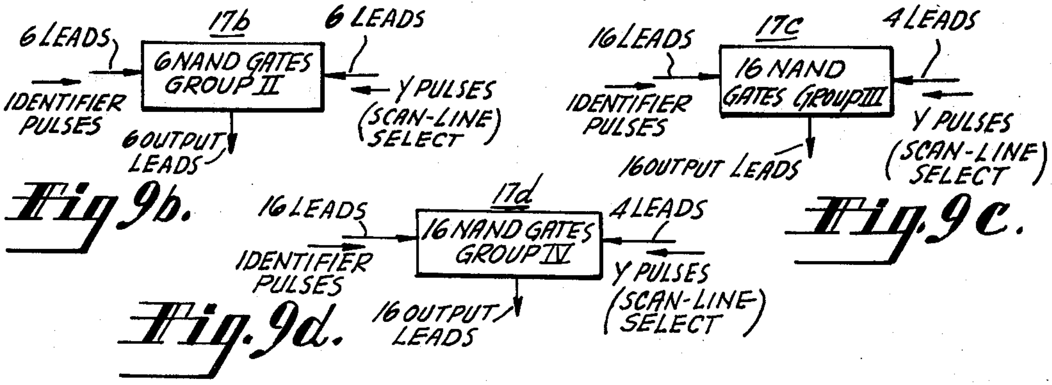

In order to select or energize a single one of forty-one leads (the forty-one character identifier leads), assuming forty-one different characters are to be displayed, so that a single selected lead is selected by a particular character code, the decoding arrangement futher comprises the group of positive NAND gates 16 connected as shown in FIG. 7.

*NAND gate 16 of 6-bit binary-to-decimal decoder*

Referring to FIG. 7, there are two rows of positive NAND gates, sixteen gates to a row, and one row of nine positive NAND gates, making a total of forty-one gates, each having an output lead. A particular character code will select a particular one of the output leads, referred to as character-identifier leads.

There is an upper group of eight input leads with a three bit code marked opposite each lead. There is a lower group of eight input leads that are similarly marked. Referring to FIG. 6, the eight output leads from gates 2G1 to 2G8 connect to the upper group of eight leads in FIG. 7 which are similarly marked. The eight output leads from gates 4G1 to 4G8 connect to the lower group of eight leads in FIG. 7 which are similarly marked. For example, the lead from 2G1 indicated as energized by code 111 connects to the top input lead (in upper group of eight) in FIG. 7 having the code 111 marked in front of it.

The NAND gates in the first row of sixteen are identified by the reference characters 5G1 to 5G16. The NAND gates in the other two rows are not identified by reference characters.

It will now be seen that when the code for character A is read out of the buffer, the two output leads (FIG. 6) marked 001 and 010 apply positive voltage (the character-identifier pulse) to two input leads (FIG. 7), these being lead 001 (upper group) and lead 010 (lower group), respectively. Since these two input leads go to the positive NAND gate 5G11, there appears on the output lead of this gate a negative voltage. This output lead, a character-identifier lead, now negatively energized by the character-identifier pulse, represents the character A; it has been selected by the A code.

Similarly, another one of the forty-one output leads from the NAND group 16 (FIG. 7) is selected by another one of the character codes. The code 010010 for the character B, for example, when read out of the buffer, energizes the output leads of gates 2G6 and 4G6 (FIG. 6) marked 010 and 010, respectively. These leads energize the correspondingly marked input leads for the NAND gates 16 (FIG. 7) which put positive voltage on the positive NAND gate 5G12 causing a negative voltage (the B character-identifier pulse) to appear on its output. Thus, this is the one of the forty-one character-identifier leads that is selected by the B code.

To review briefly, it will be seen that the read-out of a character code from the buffer 12 causes a character-identifier pulse to appear on that one of the forty-one character-identifier output leads of the gates 16 (FIG. 7) which corresponds to the character code read out. This character-identifier pulse has a duration equal to a character space (note FIG. 2); the pulse being started by the character code read out, and being stopped by the reset pulse applied to the MV's (FIG. 6).

*Diode matrix 18*

Figure 8:
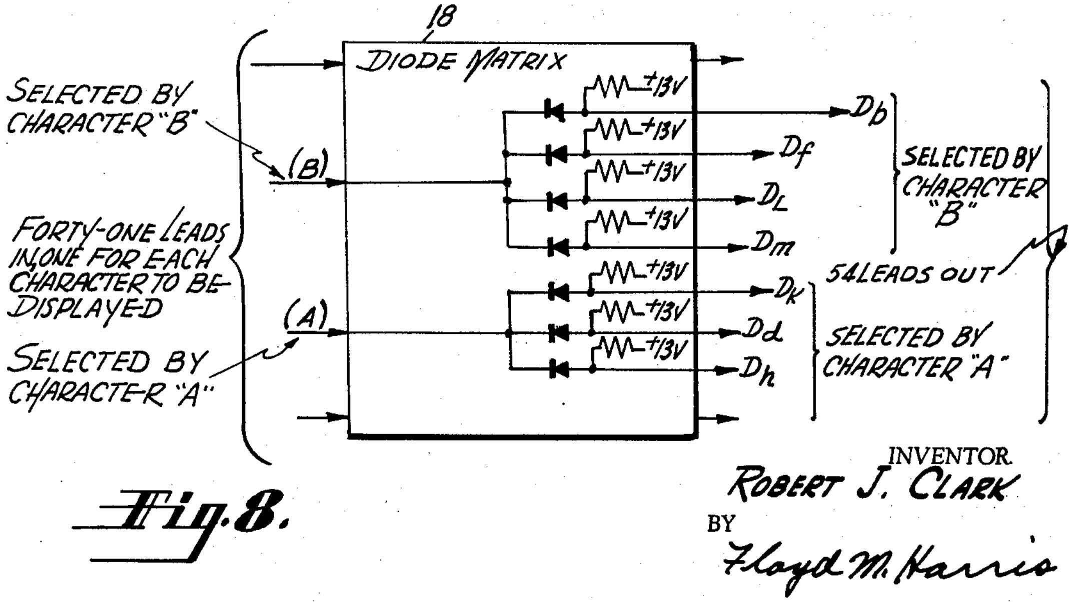
FIG. 8 is a block and partial circuit diagram of the diode matrix which precedes the scan-line select gates as shown in FIG. 3.

Referring to FIGS. 3 and 8, the diode matrix 18 has forty-one input leads which are connected to the forty-one output leads, respectively, of the NAND gates 16. Matrix 18 has a large number of output leads (fifty-four in the present example), certain ones of which are energized (made negative) when a certain one of the forty-one input leads is energized (made negative) by a character-identifier pulse. Energization of a lead may consist of dropping the voltage of a lead from a positive potential to ground potential.

In the present example, anywhere from one to eight output leads of matrix 18 may be energized by energization of one of the forty-one input leads. For example, for the character 1, only one output lead is energized; for the character A, three output leads are energized, these being the three leads marked $D_k$, $D_d$ and $D_h$, respectively; for the character B, four output leads are energized, these being the four leads marked $D_b$, $D_f$, $D_L$ and $D_m$.

*Scan-line select NAND Gates 17*

The output leads of matrix 18 connect to the character-identifier input leads of the scan-line select NAND gates 17 which are represented in FIGS. *9a*, *9b*, *9c* and *9d* as groups of gates *17a*, *17b*, *17c* and *17d*, respectively. Each of the NAND gates has a first input lead, a second input lead, and an output lead. The individual gates and gate connections are shown only in FIG. *9a* by way of example.

Referring to FIG. *9a*, it will be seen, for example, that the leads $D_k$, $D_d$ and $D_h$ which are energized by the character A identifier pulse go to the first input lead of each of the negative NAND gates 8G14, 8G7 and 8G11, respectively. Each of the other character-identifier input leads goes to the first input lead of each of the other gates.

One or more scan-line select pulses Y are applied to the second input lead of each of the NAND gates. The Y pulse occurring during the first scan line for a row of characters is identified as YP1, the one occurring during the next scan line is identified as YP2, etc., there being a total of seven pulses identified as YP1 to YP7 (note FIGS. 1 and 2).

FIG. *9a* shows how, in the present example, the pulses YP1 to YP7 are applied to the group of gates 8G1 to 8G16. It will be seen, for example, that scan-line select pulses YP1 and YP4 are applied to gate 8G7, that YP2, YP3, YP4, YP5 and YP6 are applied to gate 8G11, and that YP7 is applied to gate 8G14, these being the three gates to which the identifier pulse for character A is applied by way of leads $D_k$, $D_d$ and $D_h$. Since the character-identifier and scan-line select input pulses to the gates are negative, the output leads $D'_d$, $D'_h$ and $D'_k$ of these three negative NAND gates 8G7, 8G11 and 8G14 are energized for the duration of the character-identifier pulse, their polarity being positive. The sequence of the scan-line select action for the characters A and B, taken by way of example, is described below.

*Scan-line select action*

Assume the code for character A is read out of the buffer 12. This results in a character-identified pulse (of one character space duration) appearing on one of the forty-one output leads of the NAND gates 16 (FIG. 7), (the lead from gate 5G11), further resulting in the character-identifier pulse appearing on output leads $D_k$, $D_d$ and $D_h$ of the matrix 18 and on the corresponding input leads of the scan-line select NAND gates 17. The scan-line select input leads $D_k$, $D_d$ and $D_h$ connect to the first input leads of gates 8G14, 8G7 and 8G11, respectively. During the first scan line of the seven scan lines for a row of characters (note FIG. 2), scan-line select pulse YP1 is produced and is applied to the second input lead of gate 8G7 as shown in FIG. *9a*. Since the character A identifier pulse on lead $D_d$ is also applied to gate 8G7, the output lead $D_d$ is energized as the cathode ray scans along the first scan line and across the character space where character A is to be displayed. As will be described later, dots 2, 3 and 4 will be lighted along this character space on this scan line. During the next six scan lines, scan-line select pulses YP2, YP3, YP4, YP5 and YP6 will occur in succession and be applied to the gate 8G11 to which the character A identifier pulse is also applied from lead $D_h$, thus causing the output lead $D'_h$ to be energized as the cathode ray scans through the character space for character A on these six scan lines. Also, during the fourth scan line, YP4 energizes the output lead $D'_d$. During scan line 7, which is the last character-writing scan line, YP7 and the identifier pulse for character A energize the output lead $D'_k$.

Next assume that the code for character B is read out of the buffer 12. Now, as previously explained, the scan-line select input leads $D_b$, $D_f$, $D_L$ and $D_m$ are energized by the character B identifier pulse which is applied by way of these leads to the first input leads of gates 8G5, 8G9, 8G15 and 8G16.

During the first scan line, the pulse YP1 is generated and applied to the second input lead of gate 8G5, also the identifier pulse from lead $D_b$ is applied to this gate, thus causing the character B identifier pulse to appear on the output lead $D'_b$. Also, during the first scan line the character-identifier pulse from lead $D_f$ and the pulse YP1 are applied to gate 8G9, thus causing the character B identifier pulse to appear on the output lead $D'_f$.

During the second scan line, the pulse YP2 is generated and applied to gate 8G5, also the identifier pulse from lead $D_b$ is applied to this gate, thus energizing output lead $D'_b$ by the identifier pulse. Also, during the second scan line, the pulse YP2 is applied to gate 8G16, and also the identifier pulse from lead $D_m$, thus energizing output lead $D'_m$ by the identifier pulse.

During the third scan line, the pulse YP3 is generated and applied to gate 8G5, also the identifier pulse from lead $D_b$ is applied to this gate, thus energizing output lead $D'_b$. Also, during the third scan line, the pulse YP3 is applied to gate 8G16, and also the identifier pulse from lead $D_m$, thus energizing output lead $D'_m$.

During the fourth scan line, the pulse YP4 is generated and applied to gate 8G5, also the identifier pulse from lead $D_b$ is applied to this gate, thus energizing output lead $D'_b$. Also, during the fourth scan line, the pulse YP4 is applied to gate 8G9, and also the identifier pulse from lead $D_f$, thus energizing output lead $D'_f$.

During the fifth scan line, the pulse YP5 is generated and applied to gate 8G5, also the identifier pulse from lead $D_b$ is applied to this gate, thus energizing output lead $D'_b$. Also, during the fifth scan line, the pulse YP5 is applied to gate 8G15, and also the identifier pulse from lead $D_L$, thus energizing the output lead $D'_L$.

During the sixth scan line, the pulse YP6 is generated and applied to gate 8G5, also the identifier pulse from lead $D_b$ is applied to this gate, thus energizing the output lead $D'_b$. Also, during the sixth scan line, the pulse YP6 is applied to gate 8G15, and also the identifier pulse from lead $D_L$, thus energizing the output lead $D'_L$.

During the seventh and last character-writing scan line, the pulse YP7 is generated and applied to gate 8G5, also the identifier pulse from lead $D_b$ is applied to this gate, thus energizing the output lead $D'_b$. Also, during the seventh scan line, the pulse YP7 is applied to gate 8G9, and also the identifier pulse from lead $D_f$, thus energizing the output lead $D'_f$.

The particular ones of the five dots (FIG. 1) to be lighted during a scan line to display a character is determined as will now be described.

*Diode matrix 19*

The output leads from the scan-line select NAND gates 17, indicated at 17*a*, 17*b*, 17*c* and 17*d* in FIGS. 9*a* to 9*d*, connect to a corresponding number of input leads, respectively, to the diode matrix 19 (FIGS. 3 and 10). Thus, referring to the leads energized when the character A code is read out, as indicated in FIG. 10, the leads $D'_d$, $D'_h$ and $D'_k$ from scan-line select gates 17 connect to the matrix input leads $D'_d$, $D'_h$ and $D'_k$, respectively. The matrix 19 has eight output leads in this example. Certain ones of these eight leads are energized in response to energization of certain input leads. For example, the A character-identifier pulse and the scan-line select pulses Y applied to the scan-line select gates energize the matrix input leads $D'_d$, $D'_h$ and $D'_k$ in the example being described, with the result that when matrix input lead $D'_d$ is energized, matrix output lead S7 is energized by the character-identifier pulse; when matrix input lead $D'_h$ is energized, matrix output lead S6 is energized; and when matrix input lead $D'_k$ is energized, it also energizes matrix output lead S6.

Next, taking as another example the time the character B code is read out of the buffer 12, this read-out energizes the matrix input leads $D'_b$, $D'_f$, $D'_L$ and $D'_m$ (FIG. 10) by the character B identifier pulse during times determined by the Y pulses and by the time the B code is read out. When matrix input lead $D'_b$ is energized, matrix output lead S1 is energized; when matrix input lead $D'_f$ is energized, matrix output lead S7 is energized; when matrix input lead $D'_L$ is energized, matrix output lead S5 is energized; when matrix input lead $D'_m$ is energized, matrix output lead S5 is energized.

The eight output leads S1 to S8 of the matrix 19 connect to the dot-select NAND gates shown in FIG. 11, these gates having applied to them the character-identifier pulses from leads S1 to S8, and also having applied to them the lot-select pulses XP1 to XP5. The legend on each of the matrix output leads S1 to S5 (FIG. 10) indicates the dot-select pulses that are gated through the dot-select gate (FIG. 11) when that output lead is energized by a character-identifier pulse.

Now refer to the dot-select NAND gates shown in FIG. 11.

*Dot-select NAND gates*

The dot-select gates 21, shown in FIG. 11, comprise eight positive NAND gates 9G1 to 9G8. The eight output leads S1 to S8 of matrix 19, which carry the character-identifier pulse, connect to the first input leads S1 to S8, respectively, of the gates 9G1 to 9G8. The second input leads of these gates connect to the five dot leads X1 to X5 from the control unit 27 (FIG. 3); these five leads carry the dot pulses XP1, XP2, XP3, XP4 and XP5, respectively. Note FIG. 1 for their relation to a character space, these dot pulses occurring successively as the cathode ray scans across a character space.

In the present example, the pulses XP1, XP2, XP3, XP4 and XP5 are applied to the gates 9G1, 9G2, 9G3, 9G4 and 9G5, respectively. The pulses XP1 and XP5 are applied to the gate 9G6. The pulses XP2, XP3 and XP4 are applied to the gate 9G7. The pulses XP2 and XP4 are appiled to the gate 9G8.

The output leads of the gates 9G1 to 9G8 are connected to a common bus 31 which connects through a lead 23 to the input circuit of the video amplifier 24.

*Dot-select action*

Under the heading Scan-Line Select Action, the operation, assuming read-out of the character A and read-out of the character B, was described up to the matrix 19. The remaining operation to generate the video signal for the character A and the character B is the dot selection which will now be described.

As previously described for read-out of character A, during scan line 1 of the character row, the lead $D'_d$ (FIG. 9*a*) was energized for the duration of one character space by the character A identifier pulse. This character-identifier pulse occurs at the time along the cathode ray scan that the character A is to be written on the screen 10, the character-identifier pulse starting when character code A is read out of the buffer register.

At matrix 19 (FIG. 10) the energized input lead $D'_d$ energizes the matrix output lead S7, which energizes the first input lead S7 of gate 9G7 (FIG. 11), holding it energized for one character space. The dot-select pulses XP2, XP3 and XP4 occur successively on the second input lead of gate 9G7, and during the occurrence of these three dot pulses, three gate output pulses (video pulses) are supplied to the bus 31. Thus, as shown in FIGS. 1 and 2, the dots 2, 3 and 4 are lighted on scan line 1 to begin the writing of character A.

As the cathode ray continues to scan along scan line 1 and passes through other character spaces, the scan line 1 portion of other characters will be written on the screen 10 for display, but presently we are concerned only with how the character A is written on screen 10.

At the start of scan line 2 of the character row, the code for character A is again read out of the buffer 12, the character A being the first character in the character row in this example as shown in FIG. 2. Again, the character register 13, the gates 14 and 16 and the matrix 18 energize the three input leads $D_k$, $D_h$ and $D_d$ at the scan-line select gates 17 (FIG. 9*a*) with the character-identifier pulse for character A. During this scan line 2, both YP2 and the character-identifier pulse are applied to gate 8G11 causing energization of the output lead $D'_h$ for the duration of the character-identifier pulse. By way of matrix 19 and its output lead S6 the dot-select gate 9G6 has its first input lead S6 energized for the duration of the character space. During this time dot-select pulses XP1 and XP5 appear on the second input lead of gate 9G6. During the occurrence of XP1, gate 9G6 supplies a dot-select pulse to bus 31, and during the occurrence of XP5 gate 9G6 supplies another dot-select pulse to bus 31. These two dot-select pulses (video pulses) go to the cathode ray tube 22 by way of the video amplifier 24.

The result is that, as shown in FIGS. 1 and 2, the dots 1 and 5 are lighted on scan line 2 to continue the writing of character A on screen 10.

At the start of scan line 3 the same thing happens as for scan line 2 since YP3 is also applied to 8G11 (FIG. 9*a*); thus dots 1 and 5 are lighted on this scan line 3 for character A.

At the start of scan line 4 the output leads $D_d$ and $D'_h$ (FIG. 9*a*) are both energized during the A character space, thus energizing output leads S7 and S6 of matrix 19 and the input leads S7 and S6 of dot-select gates 9G7 and 9G6, respectively (FIG. 11). Therefore, during scan line 4, the output of 9G6 lights dots 1 and 5, and the output of 9G7 lights dots 2, 3 and 4, as shown in FIGS. 1 and 2, to continue writing character A.

At the start of scan line 5 and at the start of scan line 6 the same thing happens as during scan lines 2 and 3 since scan-line select pulses YP5 and YP6 are applied to the gate 8G11 (FIG. 9*a*), thus again energizing the input lead S6 of the dot-select gate 9G6 (FIG. 11) during scan line 5 and during scan line 6 so that dots 1 and 5 are lighted during these two scan lines.

The writing of character A is completed by lighting dots 1 and 5 during scan line 7. In the present example, this is done as a result of scan-line select pulse YP7 being applied to gate 8G14 (FIG. 9*a*) to which the character-identifier pulse is also applied by way of lead $D_k$. Thus, output lead $D'_k$ is energized which energizes, by way of matrix 19 and its output lead S6, the input lead S6 of gate 9G6 (FIG. 11). Since dot-select pulses XP1 and XP5 are applied to the other input lead of this gate, the gate output is the two video pulses corresponding to XP1 and XP5 with the result that dots 1 and 5 on scan line 7 are lighted. The writing of the character A on the cathode ray tube screen 10 is now completed.

Next consider further the display of the character B. The code for B has been read out of the buffer 12, resulting in the generation of the character B identifier pulse. The operation of the scan-line select gates 17 (FIG. 9*a*) results in the energization at certain times of their output leads $D'_b$, $D'_f$, $D'_L$ and $D'_m$ and the corresponding input leads of matrix 19 (FIG. 10). As previously described, during scan line 1 of the character row, the leads $D'_b$ and $D'_f$ are energized for the duration of the character-identifier pulse. Thus, the character B identifier pulse appears on matrix output leads S1 and S7, and appears on the input leads S1 and S7 of dot-select gates 9G1 and 9G7, respectively (FIG. 11), holding these input leads energized for one character space. The dot-select pulse XP1 is applied to the second input lead of gate 9G1, and the dot-select pulses XP2, XP3 and XP4 are applied successively to the second input lead of gate 9G7. During the occurrence of these four dot pulses, four gate output pulses (video pulses) are supplied to the bus 31. Thus, as shown in FIGS. 1 and 2, the dots 1, 2, 3 and 4 are lighted on scan line 1 to begin the writing of character B.

On scan line 2 of the character row, after the electron beam of tube 22 scans through the character A space and through the 3-dot separation space, the code for character B is again read out of buffer 12, the character B being the second character in the row in this example. Again, the four input leads $D_b$, $D_f$, $D_L$ and $D_m$ of the scan line select gates (FIG. 9*a*) are energized for the duration of the character B space. During this scan line 2, pulse YP2 and the character B identifier pulse cause energization of gate output leads $D'_b$ and $D'_m$ (FIG. 9*a*) for the duration of the identifier pulse, resulting in a corresponding energization of matrix output leads S1 and S5 (FIG. 10). Thus, the first input lead S1 of dot-select gate 9G1 (FIG. 11) is energized for the duration of the character B space. During this time dot-select pulse XP1 appears on the second input lead of gate 9G1, and it appears on the gate output lead and is supplied to the bus 31. Also, the first input lead S5 of dot-select gate 9G5 and its second input lead are energized by the character B identifier pulse and the dot-select pulse XP5, respectively, resulting in pulse XP5 being gated through to the bus 31. These two dot-select pulses XP1 and XP5 go to the cathode ray tube 22 by way of the video amplifier so that, as shown in FIGS. 1 and 2, dots 1 and 5 are lighted on scan line 2 to continue the writing of character B on screen 10.

On scan line 3, the character B identifier pulse and the pulse YP2 again energize output leads $D'_b$ and $D'_m$ of the scan-line select gates (FIG. 9*a*) for the duration of the identifier pulse, resulting in a corresponding energization of matrix output leads S1 and S5 (FIG. 10). Thus, the first input leads S1 and S5 of dot-selected gates 9G1 and 9G5 (FIG. 11) are again energized for the duration of the character B space. During this time dot-select pulses XP1 and XP5 are applied to the second input leads of gates 9G1 and 9G5, respectively, whereby they are gated through to the bus 31, and on to cathode ray tube 22. Therefore, as shown in FIGS. 1 and 2, dots 1 and 5 are lighted on scan line 3 to continue the writing of character B.

On scan line 4, the character B identifier pulse and the scan line select pulse YP4 appear on the input leads of gate 8G5 (FIG. 9*a*) to gate the identifier pulse through to output lead $D'_b$ and, thus, to energize output lead S1 of matrix 19 (FIG. 10). At the dot-select gate 9G1 (FIG. 11), input lead S1 is energized for the duration of the character B space, and during this time dot-select pulse XP1 appears on the second input lead and is gated through to the bus 31. Also, on scan line 4, the identifier pulse and the pulse YP4 are applied to gate 8G9 (FIG. 9*a*) to gate the identifier pulse through to output lead $D'_f$. This identifier pulse now appears on matrix output lead S7 (FIG. 10) and on input lead S7 of dot-select gate 9G7 (FIG. 11). During this time the dot-select pulses XP2, XP3 and XP4 appear on the second input lead of dot-select gate 9G7 so that they are gated through to the bus 31, and on to the cathode ray tube 22. Thus, on scan line 4, as shown in FIGS. 1 and 2, dots 1, 2, 3 and 4 are lighted to continue the writing of character B.

On scan line 5, the character B identifier pulse and the pulse YP5 are applied to scan-line select gate 8G5 (FIG. 9*a*) and also to gate 8G15, thus gating the identifier pulse through to the output leads $D'_b$ and $D'_L$, respectively. This results in the identifier pulse appearing on matrix output leads S1 and S5 (FIG. 10) and on the input leads S1 and S5 of dot-select gates 9G1 and 9G5, respectively (FIG. 11). During the presence of the identifier pulse, dot-select pulses XP1 and XP5 appear on the second input leads of dot-select gates 9G1 and 9G5, respectively, and are gated through these gates to the bus 31 and the cathode ray tube to light dots 1 and 5 on scan line 5 as shown in FIGS. 1 and 2.

On scan line 6, the YP6 is applied to the same scan-line select gates 8G5 and 8G15 (FIG. 9*a*) that the previous pulse YP5 was applied to. Thus, the identifier pulse is gated through to the same output leads $D'_b$ and $D'_L$ as previously during scan line 5, so that, again, dots 1 and 5 are lighted on the screen 10, this time on scan line 6 as shown in FIGS. 1 and 2.

On scan line 7, the pulse YP7 gates the character B identified pulse through the scan-line select gates 8G5 and 8G9 (FIG. 9*a*) to the output leads $D'_b$ and $D'_f$, respectively, these being the same output leads to which the identifier pulse was applied during scan lines 1 and 4. Therefore, on scan line 7 the same dot-select pulses are applied to the cathode ray tube 22 as were applied to it during scan lines 1 and 4, namely, dot-select pulses XP1, XP2, XP3 and XP4. Thus, dots 1, 2, 3 and 4 are lighted on the screen 10, this time on scan line 7 as shown in FIGS. 1 and 2. The writing of the character B on the screen 10 is now completed.

From the foregoing it will be apparent how the writing of the other characters is accomplished.

It will be noted that in the system of the present invention there are only a small number of gates that feed video signal to the video amplifier. In the specific example described there are only eight such gates, gates 9G1 to 9G8 of FIG. 11, as compared with thirty-five such gates in the example of the system described in the Stocker et al. application. Having only a small number of gates feeding the video amplifier results in an improved quality video signal for the reason that jitter in the video pulses is reduced. Gates do not gate through a signal at precisely the same time at each gate, resulting in what may be referred to as jitter. The fewer the number of gates feeding the video amplifier, the less the jitter. Another advantage in not having a large number of gates feeding into the video amplifier is that there is less distributed capacity to ground at the input of the video amplifier.

It will also be noted that the 6-bit digital-to-decimal decoder of FIGS. 6 and 7, the scan-line select gates of FIGS. 9*a* to 9*d*, and the dot-select gates of FIG. 11 are all two-input NAND gates, either positive NAND gates or negative NAND gates, which are standard logic blocks. It is apparent that in the system of the present invention there is a large duplication of these standard logic blocks. This results in reduced cost of the equipment.

Another advantage of the present invention using a group of scan-line select gates and a separate group of dot-select gates is that the digital-to-video signal generator can easily be expanded to present the particular displays desired to satisfy a particular application. For example, additional scan-line select and dot-select gates can easily be added and suitable connections made to them for the purpose of displaying additional characters.

What is claimed is:

1. A system for processing digital data character signal comprising, in combination, a cathode ray tube having a display screen on which is to be displayed a row of characters, each character corresponding to a character code of said digital data signals, each character to occupy a character space in said row, each character to be displayed on said screen by lighting selected dot spaces within the character space on one or more of a plurality of scan lines within said row, means comprising a synchronizing generator for supplying comparatively high frequency pulses at a horizontal scan frequency and comparatively low frequency pulses at a vertical scan frequency, means for deflecting the cathode ray of said cathode ray tube horizontally in synchronism with said high frequency pulses and for deflecting said ray vertically in synchronism with said low frequency pulses, a character register, means for feeding character codes into said character register to correspond with said character spaces, means coupled to said character register for decoding said character codes to provide character-identifier pulses each having a duration corresponding to a character space, means for generating scan-line select pulses which occur during the scan lines, respectively, within said row, each of said scan-line select pulses having a duration substantially equal to the duration of a scan line, first combination means for combining selected ones of said character-identifier pulses with selected ones of said scan-line selected pulses, means for applying said character-identifier pulses to said first combination means, means for applying said scan-line select pulses to said first combination means to provide intermediate pulses, means for generating dot-select pulses which occur successively during a character space as the cathode ray scans through said space, a plurality of dot-select gates, each of said dot-select gates having a first input lead, a second input lead, and an output lead, means for applying said intermediate pulses to said first input leads of said dot-select gates, means for applying said dot-select pulses to said second input leads of said dot select gates, to provide at said output leads dot pulses in response to the simultaneous application to said input leads of dot-select pulses and intermediate pulses derived from said character-identifier pulses, and means for applying said dot pulses thus gated through to said cathode ray tube for modulating its cathode ray.

2. A system for processing digital data character signals comprising, in combination, means responsive to digital data signals for storing said signals in digital form, means comprising a buffer into which said stored signals are written-in and read-out, a cathode ray tube having a display screen on which is to be displayed a row of characters, each character corresponding to a character code of said digital data signals, each character to occupy a character space in said row, each character to be displayed on said screen by lighting successively selected dot spaces within the character space on one or more of a plurality of scan lines within said row, means comprising a synchronizing signal generator for supplying television type synchronizing signals, means for applying said synchronizing signals to deflect the cathode ray of said cathode ray tube in a television raster scanline pattern, a character register coupled to said buffer, means for reading character code signals from said buffer into said character register, means coupled to said character register for decoding said character codes to provide character-identifier pulses each having a duration corresponding to a character space, means for generating scan-line select pulses which occur during the scan lines, respectively, within said row, each of said scan-line select pulses having a duration substantially equal to the duration of a scan line, first combination means for combining selected ones of said character-identifier pulses with selected ones of said scan-line select pulses, means for applying said character-identifier pulses to said first combination means, means for applying said scan-line select pulses to said first combination means to provide intermediate pulses, means for generating dot-select pulses which occur successively during a character space as the cathode ray scans through said space, a plurality of dot-select gates, each of said dot-select gates having a first input lead, a second input lead, and an output lead, means for applying said intermediate pulses to said first input leads of said dot-select gates, means for applying said dot-select pulses to said second input leads of said dot-select gates, to provide at said output leads dot pulses in response to the simultaneous application to said input leads of dot select pulses and intermediate pulses derived from said character-identifier pulses, and means for applying said dot pulses thus gated through to said cathode ray tube for modulating its cathode ray.

3. A system for processing digital data character signals comprising, in combination, means responsive to digital data signals for storing said signals in digital form, means comprising a buffer into which said stored signals are written-in and read-out, a cathode ray tube having a display screen on which is to be displayed a row of characters, each character corresponding to a character code of said digital data signals, each character to occupy a character space in said row, each character to be displayed on said screen by lighting successively selected dot spaces within the character space on one or more of a plurality of scan lines within said row, means comprising a synchronizing signal generator for supplying television type synchronizing signals, means for applying said synchronizing signals to deflect the cathode ray of said cathode ray tube in a television raster scanline pattern, a character register coupled to said buffer, means for reading character code signals from said buffer into said character register, means coupled to said character register for decoding said character codes to provide character-identifier pulses each having a duration corresponding to a character space, means for generating scan-line select pulses which occur during the scan lines, respectively, within said row, each of said scan-line select pulses having a duration substantially equal to the duration of a scan line, a plurality of scan-line select gates, each of said gates having a first input lead, a second input lead, and an output lead, a matrix device having input leads to which said character-identifier pulses are connected, said device having a plurality of output leads connected, respectively, to said first input leads of said scan-line select gates, said device including means for connecting groups of more than one of said output leads to single ones of said input leads, respectively, so that each of the leads in a group is energized by the character-identifier pulse in response to the energization by said identifier pulse of the input lead of said device to which said group is connected, means for applying said scan-line select pulses to said second input leads of said scan-line select gates, whereby a scan-line select gate gates through to its output lead a character-identifier pulse in response to the simultaneous application to its input leads of a character-identifier pulse and a scan-line select pulse, means for generating dot-select pulses which occur successively during a character space as the cathode ray scans through said space, a plurality of dot-select gates, each of said dot-select gates having a first input lead, a second input lead, and an output lead, a second matrix device having input leads to which the output leads of said scan-line select gates are connected, respectively, said second device having a plurality of output leads connected, respectively, to said first input leads of said dot-select gates, said output leads of said second device being connected to the input leads of said second device with at least certain individual ones of said second device output leads being connected to groups, respectively, of said second device input leads so that an individual one of said second device output leads is energized by the character-identifier pulse in response to the energization by said identifier pulse of any one of the second device input leads in the group to which it is connected, means for applying certain of said dot-select pulses to said second input leads of said dot-select gates, whereby a dot-select gate gates through to its output lead a dot pulse in response to the simultaneous application to its input leads of a dot-select pulse and a character-identifier pulse, and means for applying said dot pulses thus gated through to said cathode ray tube for modulating its cathode.

4. In a display system for displaying character patterns, defined by digital character codes, for display on a display device by means of a plurality of dots occurring in a plurality of substantially parallel and unidirectional scanlines generated in response to horizontal and vertical synchronizing signals applied to said display device to provide a television raster scanning pattern therein, said display device displaying simultaneously thereon a plurality of character patterns in different character spaces, the combination comprising, means responsive to different character codes for producing different character identifier pulses, each of said character identifier pulses having a duration substantially equal to the time spent in scanning in said scanline direction through a corresponding character space, said character identifier pulses being a first group of pulses, means for generating in response to said synchronizing signals scanline select pulses in synchronism with said scanlines of said raster, each scanline select pulse having a duration substantially equal to that of a raster scanline, said scanline select pulses being a second group of pulses, means for generating in response to said synchronizing signals a plurality of sets of dot-select pulses during said scanline, each of said sets of dot-select pulses forming a character space in said scanlines, said dot-select pulses being a third group of pulses, first means for combining two of said three groups of pulses to provide a plurality of sets of intermediate pulse signals, with each set of intermediate pulse signals corresponding to portions of different character patterns, second means for combining said sets of intermediate pulse signals with the remaining one of said three groups of pulses to produce sets of resultant pulse signals, with each different set of resultant pulse signals corresponding to a different character pattern, and means for applying said sets of resultant pulse signals to said display device to display said different character patterns on said display device.

5. The combination in accordance with claim 4 wherein said first means combine said character identifier pulses with said scan select pulses to produce said sets of intermediate pulse signals, and said second means combines said intermediate pulse signals with said dot select pulses to produce said sets of resultant signals.

6. The combination in accordance with claim 5 wherein each pulse in a set of said intermediate pulse signals that is derived from said first means defines one and more selected scanlines of a character pattern that include substantially identical dot combinations therein.

7. The combination in accordance with claim 6 wherein each pulse in a set of said resultant pulses derived from said second means defines said identical dot combinations occurring in said selected scanlines.

8. The combination in accordance with claim 6 wherein said first means comprises an encoder matrix network, a plurality of scanline select gates, means for applying a character identifier pulse to said matrix network to derive one and more output pulses that correspond to selected scanlines including substantially identical dot combinations, and means for applying said output pulses to said scanline select gates to provide sets of intermediate pulse signals that define said selected scanlines including said substantially identical dot combinations therein.

9. The combination in accordance with claim 8 wherein said second means comprises
an encoder matrix network,
a plurality of dot select gates,
means for applying said sets of intermediate pulse signals to said matrix network to derive output pulses that correspond to sets of said substantially identical dot combinations occurring in said selected scanlines, and
means for applying said output pulses to said dot select gates to provide sets of resultant output signals that define said substantially identical dot combinations.

References Cited

UNITED STATES PATENTS

| | | | |
|---|---|---|---|
| 3,292,154 | 12/1966 | Simmons | 340—324.1 |
| 3,305,841 | 2/1967 | Schwartz | 340—324.1 |
| 3,307,156 | 2/1967 | Durr | 340—324.1 |
| 3,309,692 | 3/1967 | Wichelmsem | 340—324.1 |

JOHN W. CALDWELL, *Primary Examiner.*

THOMAS B. HABECKER, *Examiner.*

A. J. KASPER, *Assistant Examiner.*